United States Patent Office 3,850,983
Patented Nov. 26, 1974

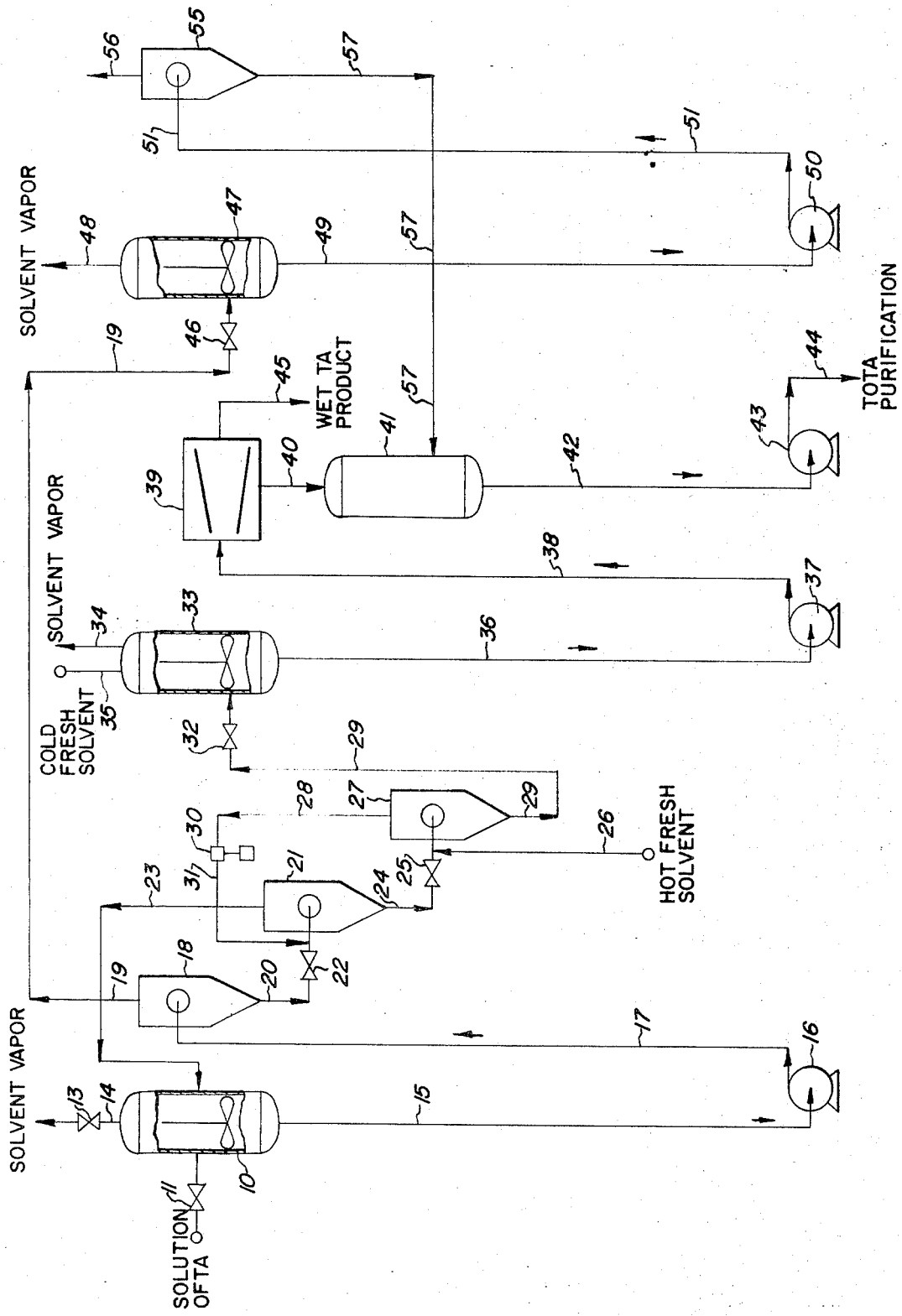

3,850,983
SEPARATION OF TEREPHTHALIC FROM PARA-TOLUIC ACID FROM SOLUTIONS THEREOF IN WATER AND/OR ACETIC ACID
Chang Man Park, Naperville, Ill., assignor to Standard Oil Company, Chicago, Ill.
Filed Oct. 15, 1973, Ser. No. 406,301
Int. Cl. C07c 63/26
U.S. Cl. 260—525                                      6 Claims

ABSTRACT OF THE DISCLOSURE

Unexpected from its solubility in water and/or acetic acid, p-toluic acid coprecipitates with and thus contaminates co-solute terephthalic acid crystallized from such solvents even though conditions for p-toluic acid saturation solubility is not exceeded or even attained. While the unexpected coprecipitation of p-toluic acid from solution in such solvents can be minimized to some extent by control of rate of temperature decrease during terephthalic acid crystallization and terminating such crystallization at a temperature in the range of 120–165° C., said unexpected p-toluic acid crystallization can be minimized more advantageously by crystallizing terephthalic acid and separating mother liquor from crystalline terephthalic acid product at a temperature not below the melting point (180° C.) of p-toluic acid.

BACKGROUND OF INVENTION

Terephthalic acid produced by the oxidation of p-xylene can be obtained in a purity of about 99–99.5 weight percent. The 0.5–1.0% impurity content comprises mainly p-formylbenzoic and p-toluic acids in a ratio of about 2:1 and lesser amounts of compounds having the benzil, fluorenone or anthraquinone structures which impart to the terephthalic acid product the color characteristic of compounds having those structures.

Methods have been disclosed for purifying such terephthalic acid products to fiber-grade quality (99.9–99.99% purity) terephthalic acid which involve catalytic hydrogen treatment at temperatures from 225 to 300° C. of solutions of such terephthalic acid product to reduce p-formylbenzoic acid to p-toluic acid. The method of U.S. Pat. No. 3,546,285 uses acetic acid as the solvent and U.S. Pat. No. 3,584,039 uses water as solvent. Elevated pressure is used to maintain solvent in the liquid phase at 225–300° C. and, for economic reasons, the solutions are substantially saturated with TA at said temperatures. Both processes require recovery of terephthalic acid by crystallization of terephthalic acid from the solutions also containing dissolved p-toluic acid at temperatures below catalytic hydrogen treatment and separation of mother liquor from crystalline terephthalic acid. In both methods, the success of obtaining fiber-grade quality terephthalic acid product by those methods can be determined by measuring p-toluic acid content of recovered crystalline terephthalic acid because the presence of the color-body minor impurities, which are not appreciably changed by catalytic hydrogenation, is directly proportional to the p-toluic acid content and their retention in the mother liquor is temperature dependent. Hence the p-toluic acid content of recovered crystalline terephthalic acid is a useful guide basis for successful removal of such color-body impurities as well as a measure of avoidance of the unexpected co-precipitation of p-toluic acid.

In those two purification methods there is encountered an anomalous co-precipitation of p-toluic acid with terephthalic acid even though there is present more solvent than is needed to keep p-toluic acid in solution. Such anomalous p-toluic acid co-precipitation can be minimized by controlling the rate of cooling to crystallize terephthalic acid and limiting the final crystallization temperature as well as mother liquor separation temperature to temperatures in the range of 120–165° C. However, such controlled crystallizations must be conducted either by batchwise or continuous operation techniques which avoid instantaneous temperature change (e.g., by flash evaporation of solvent) from purification temperature to final crystallization temperature but rather use control regulated temperature change of 0.5 to 5° C. per minute thereby making batchwise or continuous operation relatively slow and time consuming. Flash evaporations which provide instantaneous temperature change has been reported as enhancing p-toluic acid and color-body impurity co-precipitation.

Thus there is still needed a technique for rapid crystallization of terephthalic acid from solutions also containing p-toluic acid that avoids the anomalous co-precipitation of p-toluic acid and avoids precipitation of color-body impurities. The present inventive process fulfills that need.

SUMMARY OF INVENTION

The present invention comprises evaporation of solvent from the aforementioned liquid solutions of terephthalic acid (TA) and p-toluic acid as liquid effluent from such catalytic hydrogenation purifications conducted at temperatures above 225° C. by flash evaporation of solvent down to a temperature not below 180° C., the melting point of p-toluic acid, and crystallize a substantial proportion of dissolved TA. The resulting suspension of crystalline TA in residual mother liquid is subjected to a multistage classfication system wherein mother liquor is displaced with fresh hot liquid solvent all at a temperature of at least 180° C. The new suspension of crystalline TA in fresh, hot liquid solvent at temperature of at least 180° C. is depressurized and quenched down to atmospheric pressure and at or below boiling point of the solvent by combining with cold fresh solvent. By use of solid-liquid separation, wet crystalline TA product is separated from such depressurized, quenched suspension.

DESCRIPTION OF DRAWING

The accompanying drawing is a flow-sheet representation of the conduct of the continuous crystallization process of this invention and the combination of apparatus elements for one preferred specific embodiment of such process, which will later be described in detail.

The main apparatus elements in said drawing in the order in which they are used comprise crystallizer 10 in which flash evaporation of solvent water occurs as feed solution is introduced into stirred suspension of crystalline TA in residual liquid mother liquor; multi-stage mother liquor displacement and particle size classification system shown as series connected hydraulic cyclones 18, 21 and 27; centrifuge feed receiving tank 33 in which the suspension of crystalline TA in fresh solvent is maintained by stirring and is quenched by introduction of cold fresh solvent; solid-liquid separator shown as centrifuge 39 for recovery of wet TA product of desired low p-toluic acid content; fresh solvent collecting drum 41; flash drum 47 wherein substantial solvent from displaced original mother liquor is flash evaporated and a slurry concentrate of solute in residual original mother liquor is obtained; and said slurry concentrate is further separated by classification in liquid cyclone 55 to provide thickened solids suspension for recycle with fresh solvent to TA purification. Also shown are the pressure control valves, transfer lines, and the pumps needed to move the various suspensions of TA through the system.

EMBODIMENTS OF THE INVENTION

The present invention provides a rapid continuous crystallization of terephthalic acid (TA) from solution in water, acetic acid, and/or mixture thereof, also containing p-toluic acid and color-body impurities to substantially eliminate the temperature dependence of p-toluic acid co-precipitation on crystal nuclei of TA resulting in p-toluic acid inclusion in TA crystals. This is accomplished by cooling such solutions from the catalytic hydrogen treatment purification temperature down to a final temperature of not below the 180° C. melting point temperature of p-toluic acid and preferably of about 190 to 210° C. Such final temperature of cooling is essential to the present invention and differs conceptionally from imposing a lower temperature limit on TA crystallization from solution by taking into account normal or abnormal temperature dependence of a cocrystallizable co-soluble such as p-toluic acid. Thus, the foregoing limitation on final temperature of cooling not below the melting point of p-toluic acid is used to the advantage of avoiding the abnormal temperature dependence of p-toluic acid resulting in the aforementioned co-precipitation thereof from the solution containing dissolved TA.

Such cooling of the catalytic hydrogen treated solution to a temperature not below the melting point of p-toluic acid can be substantially instantaneous, for example by continuously flash evaporation of solvent from the temperature and pressure of such treatment, for example, from 275° C. and 65 atmospheres, into the liquid in a stirred crystallization zone operated at a temperature of 205° C. and 16.7 to 16.8 atmospheres pressure. As will be appreciated, such flash evaporation crystallization will produce a substantial amount of small TA crystals below 20–50$\mu$ size which are not recoverable by commercially feasible means, e.g. by centrifuges, if the resulting suspension of solids is withdrawn at the rate it is produced. However, the retention time in such stirred crystallization zone can be advantageously increased to a period of 15 to 30 minutes to permit some crystal growth therein. Growth of small TA crystals in the stirred crystallization zone is further enhanced by a recycle stream from a later conducted solids-liquid separation and particle size classification system.

In the present inventive process the substantially instantaneous crystallization is followed by a multi-stage and purpose system wherein original mother liquor is displaced by fresh solvent and the TA crystalline product is also washed by fresh solvent all at or slightly above the final conditions of TA crystallization to insure retaining p-toluic acid above its melting point. Such a multi-stage and purpose system makes use to advantage of classification by density difference to not only separate large TA crystals from small TA crystals but also to separate solids from liquids and to displace mother liquor with fresh solvent. Any means for effecting such classifications can be used. For example, separation of the originally produced suspension of small TA crystals can be accomplished by gravity in a settling tower, trays or decanters or by centrifugal force in cyclones which permit separation of a substantial amount of original mother liquor as overflow and a thickened suspension of TA crystals as underflow and to which fresh solvent may or may not be added in all stages in counter- or cross-flow for mother liquor displacement. It is preferred to use at least three of such stages connected in series flow relationship to which fresh solvent is used in counter-flow and is so added in the last two stages but more preferably such counter-flow addition only to the last stage. The most preferred multi-stage and purpose system contains three series connected centrifugal classification zones provided by hydraulic cyclones also known as hydroclones into which the feed enters tangentially to provide the classifying centrifugal force and from which the heaviest or concentrate suspension of solids is discharged as underflow and lighter separated fluid is discharged as overflow.

In the operation of such series connected three hydraulic cyclones, the first stage is used only for TA solids suspension thickening by removal of a substantial proportion of the original mother liquor as overflow and provision of underflow as thickened TA solids suspension in the remainder of the mother liquor. Said overflow of mother liquor is charged to solvent recovery or separation later described. Said underflow of thickened suspension of TA solids is charged as feed to the second hydroclone stage.

Also charged to the second hydroclone stage is the overflow from the last or third stage which third stage overflow comprises some of the small TA crystals suspended in fresh solvent. Thus in the second stage there occurs dilution of the first stage suspension of thickened suspension of TA solids in original mother liquor, washing of the TA solids by fresh solvent once used as wash liquor in the last sage, thickening of the diluted suspension of TA solids and increased displacement of original mother liquor. The fluid overflow from the second stage comprising most of the remaining original mother liquor, a substantial proportion of the second wash use of fresh solvent and small TA crystals is charged to the stirred crystallization zone for enhancement of TA crystal growth therein.

The second stage underflow is charged as part of the feed to the third stage hydraulic cyclone. Fresh solvent at a temperature above 180° C. makes up the remainder of the feed to the third stage wherein, as in the second stage, there occurs dilution of the thickened TA solids suspension, washing of the suspended TA solids, displacement of solvent carried from the second stage to the third stage, removal of the remaining small TA crystals, and thickening of the suspension of TA solids. The overflow fluid from the third stage comprises fresh solvent wash liquor and displaced second stage liquor as the liquid portion of the overflow fluid and suspended remainder of the small TA crystals as remainder of the overflow fluid. Such third stage fluid is charged to the second stage hydraulic cyclone as part of its feed as before mentioned. The third stage underflow thickened TA solids suspension composites only two components which are fresh solvent and suspended TA solids.

Said third stage underflow is still at substantially the temperature and pressure of the stirred crystallization zone and can be subjected to commercially feasible solid-liquid separation at those temperature and pressure conditions or after depressuring to one atmosphere by cooling about to the boiling point temperature of the solvent.

The TA so recovered will have, on a washed and dried basis, a p-toluic acid content at least equal to that in TA solids (same basis) recovered from the typical operation of the before mentioned slow, controlled batchwise or continuous crystallization conducted to avoid instantaneous TA crystallization. Such p-toluic acid content is in the range of 50–150 weight parts per million of the dried recovered TA product. However, instead of taking several hours to reach the point of solids-liquid separation to recover TA product of that purity, the process of this invention from continuous one stage crystallization to said solid-liquid separation to obtain TA product can be conducted in less than 60 minutes on the same TA throughput because of the elimination of the time consuming, precisely controlled, slow crystallization which contribute most of those hours of process time and bulky crystallization system.

The p-toluic acid content of the recovered TA can be further reduced from the 50–100 weight p.p.m. in a simple, short time additional step. This additional step consists of quench cooling said third stage underflow thickened suspension of TA solids by combining it with fresh colder solvent, e.g. solvent at ambient temperature, in a stirred receiving and holding zone which also serves as feed supply source for solids-liquid separation, i.e., filtration or centrifugation. The amount of colder quench solvent used will, of course, depend on the heat content of the third stage underflow thickened suspension of TA solids and the temperature of the colder quench solvent but otherwise the amount thereof is not critical. Conveniently the amount of colder quench solvent at ambient temperature can be the amount of solvent required for the purification by catalytic hydrogen treatment of the solution of crude TA product of 99 to 99.5 weight percent TA content obtained from p-xylene oxidation. After said quenching with fresh colder solvent, the resulting slurry is subjected to solids-liquid separation for example in a centrifugal filter. The wet filter cake is dried and the removed solvent is sent to the front end of purification process as the solvent to dissolve more crude TA product.

As before mentioned, the overflow from the first stage hydraulic cyclone is further processed to recover the dissolved TA. Said first stage overflow is at a temperature above 180° C. and a pressure to maintain the solvent in the liquid phase. Such hot, pressurized first stage overflow can be flash evaporated at one atmosphere (0 p.s.i.g.) or ambient pressure. A substantial amount of dissolved TA is crystallized out of solution at the ambient equilibrium temperature. Thus obtained slurry is subjected to a further solid-liquid separation to recover said TA crystals which are contaminated with p-toluic acid and other undesirable by-products. The said recovered TA crystals are recycled back to the front end of purification process so that TA yield in the purification process will be improved.

SPECIFIC EMBODIMENT

The process of this invention will be described according to the accompanying flow sheet representation thereof, by the processing of an aqueous solution at a temperature of 275° C. and a pressure of 65.3 atmospheres obtained after degassing (release of hydrogen) the aqueous solution which has been subjected to catalytic hydrogen treatment before described. It should be understood that the accompanying flow sheet is only for the purpose of illustration of this invention, is not to be considered as limiting the teachings of the inventive concept disclosed herein. Said degassed solution contains 26.35 pounds of TA per 100 pounds of water and based on said TA, 0.246 weight percent p-toluic acid and 0.075 weight percent other by-products and color-body impurities. Such solution contains a total of 26.435 pounds dissolved solids per 100 pounds of solvent water.

Said solution at the temperature of 275° C. and pressure of 65.3 atmospheres is charged at a rate of 126.435 pounds per hour via heated (275° C., flow controlling) valved flow control line 11 and enters below the liquid level in stirred crystallizer 10 operated at the temperature of 205° C. and gauge pressure of 15.8 atmospheres together with 104.3 pounds per hour overflow from hydraulic cyclone 21 via overflow discharge line 23. Said overflow at 104.3 pounds per hour is also at the temperature of 205° C. and 15.8 atmospheres gauge pressure and contains about 4.12 weight percent dissolved and fine crystalline TA. The substantially instantaneous change of 70° temperature and 34.8 atmospheres pressure of solution feed upon entering stirred crystallizer 10 results in the vaporization of 20.00 pounds per hour of solvent water and precipitation of 24.712 pounds TA per hour. The water vapor discharges to atmospheric pressure through vapor vent 14 and pressure control valve 13 set at 15.8 atmospheres gauge pressure. The resulting stirred suspension of 24.712 pounds TA in 185.94 pounds of aqueous mother liquor containing 2.5 pounds dissolved TA per 100 pounds of water is withdrawn from stirred crystallizer 10 via discharge line 15 by pump 16 which discharges the suspension into transfer line 17.

The suspension in line 17 is charged tangentially into hydraulic cyclone 18, first of three series connected hydraulic cyclones. The overflow from hydraulic cyclone 18 at 164.214 pounds per hour with about 2.5 dissolved TA and 2.2 pounds suspended TA discharges into transfer line 19 to be conveyed at 205° C. and 15.8 atmospheres through flow control valve 46 and into the stirred liquid contained in flash drum 47 operated at atmospheric pressure. From flash drum 47 32.3 pounds of water per hour are vaporized by decrease of 105° temperature to 100° C. and 15.8 atmospheres pressure to atmospheric pressure. Such water vapor at atmospheric pressure can be discharged into the atmosphere via vapor discharge line 48. The suspension of TA in flash drum 47 is withdrawn at 131.9 pounds per hour via transfer line 49 by pump 50 which discharges into transfer line 51 into hydraulic cyclone 55 operated as a suspension thickener whose overflow at 115.7 pounds per hour from hydraulic cyclone 55 contains no significant amount of TA and can be discarded via overflow transfer line 56. Underflow thickened suspension at 16.2 pounds per hour discharges from hydraulic cyclone 55 via transfer line 57 leading to collecting drum 41.

Thickened TA slurry in remaining mother liquor is discharged at 46.4 pounds per hour with 23.7 pounds of suspended TA from first hydraulic cyclone 18 via its discharge line 20 through valved flow controller 22 also receiving the repressurized overflow from third hydraulic cyclone 27 as tangential feed to second hydraulic cyclone 21. The overflow at 104.3 pounds per hour from hydraulic cyclone 21 discharges via transfer line 23 to stirred crystallizer 10. The underflow suspension at 46.4 pounds per hour from hydraulic cyclone 21 discharges via transfer line 24 and with 100.0 pounds per hour hot, pressurized fresh water at 205° C. and 15.8 atmospheres gauge pressure flows via valved flow control 25 as feed introduce tangentially into third hydraulic cyclone 27 for reconcentration of TA suspension. The overflow at 104.3 pounds per hour from hydraulic cyclone 27 discharges into transfer line 28 to pump 38 which repressurizes said overflow to 15.8 atmosphere pressure to maintain said pressure for constant pressure operation of the three series connected hydraulic cyclones 18, 21 and 27. The underflow from third hydraulic cyclone 27 comprising 20.1 pounds TA and 22.0 pounds water with 0.0005 pounds p-toluic acid is discharged at 42.1 pounds per hour via transfer line 29 and flow controller 32 into stirred tank receiver 33 operated at atmospheric pressure and 100° C. with fresh cold (13–15° C.) water from line 35 at 70.0 pounds per hour. Water vapor resulting from the change of 105° C. temperature (from 205 to 100° C.) and 15.8 atmospheres (15.8 to 0 atmosphere gauge) pressure is discharged to the atmosphere through vapor transfer 34 from stirred tank receiver 33. The suspension of TA in stirred tank receiver 33 is taken through discharge line 36 by pump 37 and charged via suspension feed line to centrifugal filter 39 for solid-liquid separation. Wet TA solids at 22.1 pounds per hour are discharged from centrifugal filter 39 via solids discharge 45. Aqueous liquor (substantially only fresh water) is discharged from centrifuge 39 via discharge line 40 into collecting drum 41. The aqueous-streams collected therein from lines 40 and 57 are taken via discharge line 42 by pump 43 and transferred via line 44 to dissolve crude TA as feed to catalytic hydrogen treatment (not shown) to continue TA purification and recovery.

The recovered TA after drying has from 0.0005 to 0.0030 weight percent p-toluic acid, typically 0.0010 weight percent.

The process of the preceding illustrative example can be as readily practiced with acetic acid or aqueous acetic acid as solvent using the effluent from the crude TA purificaion of U.S. Pat. No. 3,546,285 as feed to stirred crystallizer 10. For example the feed to stirred crystallizer 10 introduced into the liquid therein via valved flow control line 11 can be either of the following solutions at 300° C. and at a suitable pressure.

|                          | Solution A | Solution B |
|--------------------------|------------|------------|
| Acetic acid—pounds       | 100        | 95         |
| Water—pounds             | 0          | 5          |
| TA—pounds                | 10         | 20         |
| p-Toluic acid—pounds     | 0.025      | 0.049      |

The operation of crystallizer 10 and hydraulic cyclones 18, 21 and 27 can still be at a temperature of 205° C. to maintain a temperature above the melting point of p-toluic acid but the operating pressure shall be slightly higher than the vapor pressure of said solvent system. The acetic acid or 95% acetic-5% water vapors discharged from stirred crystallizer 10, stirred tank receiver 33 and flash drum 48 by their respective vapor lines 13, 34 and 48 will now need to be condensed and the condensate processed to recover the respective solvents. Also the overflow from hydraulic cyclone 55 discharged by line 56 cannot be discarded as when water is the solvent, but rather such overflow is processed with the condensates from vapor lines 34 and 48 to recover the respective 100% acetic acid and 95% acetic acid-5% water solvents.

In place of the flow sheet drawing illustrated three stages for displacement of original mother liquor, washing of TA solids and thickening of suspended TA solids and the use thereof described in the Example, four or more multi-purpose stages can be used without adding any substantial processing time. For four of such multi-purpose stages as the preferred hydraulic cyclones, the additional stage is inserted between the illustrated second and third stages. The last or fourth stage is operated as before described but with fresh solvent but it receives underflow from the added third stage. The overflow from the now fourth stage with the underflow from the second stage is freed to the new third stage. The overflow from the new third stage and the underflow from the first stage comprises the feed to the second stage. Additional multi-purpose stages are inserted between the said third and fourth stages and are operated flow-wise as just described for the above third stage. Thus the first two stages are always operated as first described with respect to their overflow streams and the last, whether it is fifth, sixth, etc. stage always receives fresh solvent and underflow from the next preceding stage as it feeds and sends its overflow as part of the feed to the next preceding stage. Furthermore, said multi-stage system may be arranged such that the mother liquor displacement may be done cross-currentwise instead of illustrated countercurrent arrangement. The use of hydraulic cyclone for solid-liquid separation and solids classification is well known to those skilled in the art, and it should be understood that any variation of the systems arrangement from said multi-stage system is still within the scope of spirit and teaching of this invention.

What is claimed is:

1. In a process of purification of terephthalic acid (TA) containing p-formylbenzoic and p-toluic acids as main impurities and lesser amounts of color-body impurities, other heavy end by-products, and multifunctional impurities by the catalytic hydrogenation at a temperature in the range from 225 to 300° C. of a solution substantially saturated with such impure TA at said temperature in a liquid phase of solvent comprising water or acetic acid containing 0 to 45 weight percent water, cooling the resulting solution containing p-toluic acid as the main impurity in quantity to crystallize TA at a temperature in the range of 50–165° C. and separating crystalline TA from mother liquor; the improvement comprising crystallizing TA by cooling the solution through flash evaporation of a portion of solvent from the temperature range of 225 to 300° C. down to a lower temperature having 180° C. as the minimum temperature and a lower pressure sufficient to maintain remaining solvent in the liquid phase at such lower temperature; subjecting the suspension of crystalline TA in remaining solvent to a classification-liquid displacement system operated at such lower temperature wherein a substantial portion of the remaining liquid solvent solution of p-toluic acid and other undesirable impurities are removed and a concentrated crystalline TA suspension is diluted with fresh solvent at such lower temperature and reconcentrated as a means for displacing substantially all remaining original solvent solution of p-toluic acid and other undesirable impurities, and forming a new suspension of crystalline TA in hot fresh solvent; depressurizing and quenching said new suspension of crystalline TA by the addition thereto of cold fresh solvent in an amount to depressurize to atmospheric pressure and cool down to at least the boiling point of the fresh solvent at atmospheric pressure, and separating crystalline TA from fresh solvent at atmospheric pressure.

2. The process of Claim 1 wherein said classification system comprises at least three stages of centrifugal classification wherein the suspension of crystalline TA in original solvent at said lower temperature is introduced into the first stage, a thickened suspension of crystalline TA is withdrawn as first stage underflow and a substantial portion of liquid solvent is withdrawn as overflow; charging as feed to the second stage the combination of first stage underflow thickened TA suspension and third stage overflow liquid as diluent, charging second stage overflow liquid to the step of flash evaporation of solvent, and withdrawing rethickened suspension of crytalline TA as second stage underflow; wherein the stages between the second and last stages each receive as feed a combination of thickened suspension of crystalline TA underflow from the preceding stage and liquid overflow from the subsequent stage as diluent, discharge liquid overflow as diluent for the preceding stage feed and discharge underflow as part of the feed to the subsequent stage; and wherein the feed to the last stage is a combination of fresh hot solvent liquid at a temperature of at least 180° C. and underflow thickened TA suspension from the preceding stage, the liquid overflow from the last stage is the diluent portion of feed to the preceding stage and the last stage underflow thickened new suspension of crystalline TA is feed to the depressurizing and quenching step.

3. The process of Claim 2 wherein the original solvent, hot fresh solvent and cold fresh solvent are said acetic acid.

4. The process of Claim 3 wherein the original solvent, hot fresh solvent and cold fresh solvent are water; the classification system comprises three centrifugal classification stages, the hot fresh water is combined with underflow thickened suspension of crystalline TA from the second stage as feed to the third stage; and the underflow thickened new suspension of crystalline TA from the third stage is depressurized to atmospheric pressure and cooled to at least 100° C. with cold fresh water.

5. The process of Claim 4 wherein there is feed as fed to the flash evaporation of solvent water the separate feeds comprising the liquid overflow from the second classification stage at a temperature of 205° C. and 15.8 atmospheres pressure and the aqueous solution at a temperature of 275° C. and pressure of 66.3 atmospheres and containing 26.35 weight parts of TA for each 100 weight parts water; the flash evaporation of solvent is to a temperature of 205° C. and a pressure of 15.8 atmospheres; all three classification stages are operated at the temperature of 205° C. and pressure of 15.8 atmospheres; the hot fresh water added as feed diluent to the third classfication stage is at a temperature of 205° C. and pressure of 15.8 atmospheres; and the underflow new suspension of crystalline TA from said third stage is quenched to 100° C. and depressurized to atmospheric pressure with fresh fater at 13–15° C.

6. The process of Claim 5 wherein the liquid overflow from the first centrifuged classification stage is depressured to atmospheric pressure and cooled to 100° C. by flash evaporation of solvent, the solvent vapor is discarded, the remaining solvent at 100° C. and atmospheric pressure is recycled with water from separation of crystalline TA to dissolve impure TA as feed to the catalytic hydrogenation purification.

References Cited

UNITED STATES PATENTS

| | | | |
|---|---|---|---|
| 3,452,088 | 6/1969 | Olsen et al. | 260—525 |
| 3,497,552 | 2/1970 | Olsen | 260—525 |
| 3,639,465 | 2/1972 | Olsen et al. | 260—525 |
| 3,708,532 | 2/1972 | Ichikawa et al. | 260—525 |

LORRAINE A. WEINBERGER, Primary Examiner

R. D. KELLY, Assistant Examiner

U.S. Cl. X.R.

23—296

PO-1050
(5/69)

UNITED STATES PATENT OFFICE
CERTIFICATE OF CORRECTION

Patent No.     3,850,983          Dated    November 26, 1974

Inventor(s)    Chang Man Park

It is certified that error appears in the above-identified patent and that said Letters Patent are hereby corrected as shown below:

| Col. | Line | | |
|------|------|------|------|
| 3 | 69 | "preferably such" should be | -- preferably by such -- |
| 4 | 20 | "sage" should be | -- stage -- |
| 4 | 56 | "crystallization" should be | -- crystallizations -- |
| 8 | 69 | "fater" should be | -- water -- |

Signed and sealed this 11th day of March 1975.

(SEAL)
Attest:

RUTH C. MASON
Attesting Officer

C. MARSHALL DANN
Commissioner of Patents
and Trademarks